US012479264B2

(12) United States Patent
Förster et al.

(10) Patent No.: US 12,479,264 B2
(45) Date of Patent: Nov. 25, 2025

(54) HEAT EXCHANGER AND MOTOR VEHICLE

(71) Applicant: MAHLE INTERNATIONAL GMBH, Stuttgart (DE)

(72) Inventors: Uwe Förster, Erdmannhausen (DE); Sascha Unger, Ludwigsburg (DE); Gerrit Wölk, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 219 days.

(21) Appl. No.: 18/215,446

(22) Filed: Jun. 28, 2023

(65) Prior Publication Data

US 2024/0001730 A1 Jan. 4, 2024

(30) Foreign Application Priority Data

Jun. 30, 2022 (DE) ......................... 102022206675.8

(51) Int. Cl.
*B60H 1/00* (2006.01)

(52) U.S. Cl.
CPC ................................ *B60H 1/00328* (2013.01)

(58) Field of Classification Search
CPC .............................. F28F 9/0246; F28F 9/0253
See application file for complete search history.

(56) References Cited

U.S. PATENT DOCUMENTS 4,911,236 A * 3/1990 Laveran .................. F28F 9/262 62/515
5,743,111 A * 4/1998 Sasaki ..................... F25B 13/00 165/110

(Continued)

FOREIGN PATENT DOCUMENTS

DE 102007049942 7/2008
DE 102010043000 5/2012

(Continued)

*Primary Examiner* — Devon Lane
(74) *Attorney, Agent, or Firm* — Barnes & Thornburg LLP

(57) ABSTRACT

The invention relates to a heat exchanger (1), in particular for a motor vehicle. The heat exchanger (1) includes a plurality of tubular bodies (2) stacked onto one another along a stack direction (S), which in each case delimit a first fluid path (3*a*) for being flowed through by a refrigerant (K). The individual tubular bodies (2) are arranged along the stack direction (S) spaced apart from one another, so that between intermediate spaces (4) formed between the tubular bodies (2) that are adjacent in the stack direction (S), each form a second fluid path (3*b*) fluidically separated from the first fluid paths (3*a*) for being flowed through by air. The individual tubular bodies (2) extend transversely, preferentially perpendicularly to the stack direction (S) along a longitudinal direction (L). On a, with respect to the longitudinal direction (L), first longitudinal end (6*a*) of the tubular bodies (2) a vessel (7) which extends in the stack direction (S) and fluidically communicates with the tubular bodies (2) is arranged. At least one inlet/outlet connector (9) at least partially delimiting a connector interior (10) projects from the vessel (7) to the outside for introducing the refrigerant into a vessel interior (8) surrounded by the vessel (7). The connector interior (10) opens into the vessel interior (8), so that refrigerant can be introduced into the connector interior and via the same conducted on into the vessel interior. The heat exchanger (1) comprises at least one connecting line (5) that can be flowed through by the refrigerant, by means of which the connector interior (10) fluidically communicates with the vessel interior (8).

19 Claims, 4 Drawing Sheets

(56) References Cited

U.S. PATENT DOCUMENTS

Figure 1:
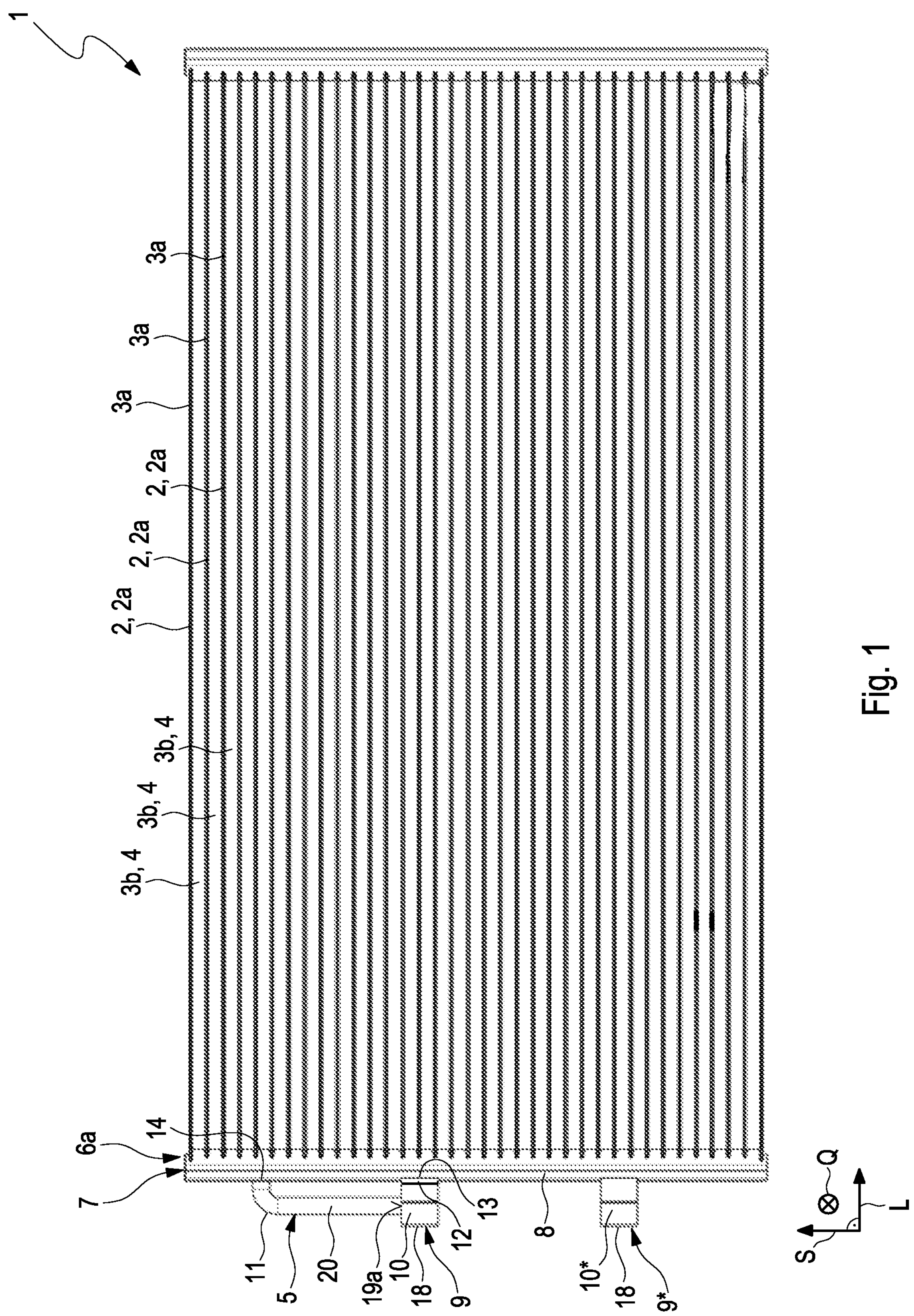

| | | | | |
|---|---|---|---|---|
| 7,210,521 | B2 * | 5/2007 | Rauser | F28F 9/0202<br>165/83 |
| 10,161,656 | B2 * | 12/2018 | Cho | F28F 9/026 |
| 10,578,377 | B2 * | 3/2020 | Abastari | F28D 1/047 |
| 10,976,085 | B2 * | 4/2021 | Onaka | F28D 1/047 |
| 2008/0029259 | A1 * | 2/2008 | Rechea | F28F 9/0256<br>165/178 |
| 2008/0115615 | A1 | 5/2008 | Lim et al. | |
| 2017/0097179 | A1 * | 4/2017 | Martin | F25B 39/00 |
| 2018/0231282 | A1 * | 8/2018 | Meldrum | F25B 41/40 |
| 2020/0025427 | A1 * | 1/2020 | Higashiiue | F25B 39/028 |
| 2021/0140692 | A1 * | 5/2021 | Akaiwa | F25B 41/42 |
| 2021/0283992 | A1 * | 9/2021 | Rhee | F28F 9/0246 |

FOREIGN PATENT DOCUMENTS

| | | |
|---|---|---|
| EP | 1568959 | 8/2005 |
| EP | 2447097 | 5/2012 |

* cited by examiner

HEAT EXCHANGER AND MOTOR VEHICLE

CROSS-REFERENCE TO RELATED APPLICATIONS

This application claims priority from German Application No. DE 10 2022 206 675.8, which was filed on Jun. 30, 2022, the entirety of which is hereby fully incorporated by reference herein.

The invention relates to a heat exchanger, in particular for a motor vehicle and to a refrigerant circuit having such a heat exchanger. The invention, further, relates to a motor vehicle having such a refrigerant circuit.

Such heat exchangers are described for example in EP24447097 B1 and in DE10 2010 043 000 A1.

There, the refrigerant is usually distributed via a common vessel—typically referred to as distributor—over the individual tubular bodies of the heat exchanger each forming a respective refrigerant path.

On the air side, the surface temperature of the tubular bodies can reduce to such an extent that it is below the dew point. In this case, water contained in the air can condense. In an extreme case, ice can even form from the condensed water.

This disadvantageous effect is aided in conventional heat exchangers in that the refrigerant introduced into the vessel or the distributor is unevenly distributed over the individual refrigerant paths or over the tubular bodies forming these refrigerant paths. This can lead to an undesirable reduced output of the heat exchanger functioning as evaporator because of the only partial flow through the individual coolant paths or tubular bodies and because of the icing-up that has taken place.

It is therefore an object of the present invention to create an improved embodiment for a heat exchanger, in particular an evaporator, with which the disadvantage explained above merely occurs in a reduced form, ideally not at all.

This object is solved through the subject of the independent patent claims. Preferred embodiments are subject of the dependent patent claims.

Accordingly, the basic idea of the invention is to equip a vessel, which is provided as distributor of refrigerant over the individual tubular bodies of a heat exchanger, not only in the conventional manner with an inlet/outlet connector for introducing the refrigerant into the vessel or for discharging the refrigerant out of the vessel, but complement the said connector by a connecting line which, spaced apart from the actual inlet/outlet connector, opens into the vessel. In this way, a part of the refrigerant introduced into the inlet/outlet connector can be transported separately from the remaining part of the refrigerant to a different position in the vessel, so that the tubular bodies present in this region can be supplied with additional refrigerant.

Any imbalance in the distribution of the refrigerant from the vessel to the individual tubular bodies to the effect that those tubular bodies, which are arranged closer to the inlet/outlet connector, are proportionally supplied with more refrigerant than tubular bodies further distant from the inlet/outlet connector is thus counteracted. In this way, a particularly even distribution of the refrigerant over the individual tubular bodies is achieved. By way of this, the efficiency in turn of the heat exchanger or evaporator is improved. In addition to this, the solution proposed here is accompanied by an increased flexibility with respect to the positioning of the inlet/outlet connector on the vessel, since with the help of the connecting line that is substantial to the invention an additional refrigerant supply to those tubular bodies, which are arranged at a greater distance from the inlet/outlet connector than those tubular bodies that are arranged closer or in the immediate vicinity of the inlet/outlet connector, is provided. Thus, the inlet/outlet connector can be more flexibly arranged in the stack direction in different positions of the vessel. In particular it is not essential with the solution according to the invention introduced here to arrange the inlet/outlet connector, with respect to the arrangement of the individual tubular bodies, along the stacking direction in the middle of these in order to ensure as even as possible a distribution of the refrigerant over the individual tubular bodies.

In detail, the heat exchanger according to the invention, which can be employed in particular as evaporator and/or as condenser in a refrigerant circuit of a motor vehicle, includes a plurality of tubular bodies stacked onto one another along a stack direction, which in each case delimit a first fluid path for being flowed through by a refrigerant. The individual tubular bodies are arranged spaced apart from one another along the stack direction, so that intermediate spaces formed between the tubular bodies that are adjacent in the stack direction each form a second fluid path that is fluidically separated from the first fluid paths for being flowed through by air. In the intermediate spaces, a rib structure with ribs can be arranged in each case, on which the two tubular bodies delimiting the respective intermediate space in the stack direction can support themselves. The individual tubular bodies extend transversely, preferentially perpendicularly, to the stack direction along a longitudinal direction. Preferably, the tubular bodies can extend vertically or horizontally with respect to the direction of gravity. At a, with respect to the longitudinal direction, first longitudinal end of the tubular bodies, a vessel which extends in the stack direction and fluidically communicates with the tubular bodies is arranged, which depending on the fluidic interconnection of the heat exchanger in a refrigerant circuit is arranged for distributing the refrigerant over the first fluid paths or for collecting the refrigerant having flowed through the first fluid paths. At least one inlet/outlet connector partially delimiting a connector interior for introducing the refrigerant into a vessel interior surrounded by the vessel or for discharging the refrigerant out of the vessel interior projects from the vessel towards the outside. To this end, the connector interior opens into the vessel interior so that by way of a connector opening, which is provided on the inlet/outlet connector on the front side and faces away from the vessel, refrigerant can be introduced into the connector interior and via the same passed on into the vessel interior. Further, the heat exchanger includes a connecting line that can be flowed through by the refrigerant, by means of which the connector interior—additionally to the direct fluidic connection between connector interior and vessel interior—fluidically connects with the vessel interior.

In a preferred embodiment, the connecting line is formed by a connecting tubular body surrounding a tubular body interior. Such a connecting tubular body can be produced in a simple manner and mounted to the inlet/outlet connector or vessel. In addition to this, cost advantages in the manufacture of the heat exchanger materialise.

According to an advantageous further development, the connecting line or the connecting tubular body can be arranged in the connector interior. The connecting line or the connecting tubular body in this variant is thus integrated in the inlet/outlet connector. This variant requires particularly little installation space. Alternatively, the connecting line or the connecting tubular body can also be arranged outside the connector interior and extend from the inlet/outlet connector to the vessel or to the vessel interior and in the process project from the inlet/outlet connector. This variant can be particularly easily realised technically.

In a preferred embodiment, a fluidic parallel connection is realised by means of the connecting line. In this way, the refrigerant can be introduced into the vessel or into the vessel interior either directly via the connector interior or indirectly via a successive flow through connector interior and connecting line.

In another preferred embodiment, at least ¼ of all tubular bodies are arranged along the stack direction between an opening of the inlet/outlet connector and an opening of the connecting line into the vessel. In this way, the said number of tubular bodies is fluidically bridged with the help of the connecting line, so that refrigerant transported through the connecting line can be introduced into tubular bodies which are arranged along the stack direction at a relatively large distance from the inlet/outlet connector.

Particularly practically, at least three, preferentially at least five tubular bodies can thus be arranged along the stack direction between the opening of the inlet/outlet connector and the opening of the connecting line into the vessel.

According to an advantageous further development, two connecting lines can be provided on the inlet/outlet connector, which, located opposite one another in the stack direction, project from the inlet/outlet connector and both, spaced apart from one another and spaced apart from the inlet/outlet connector, open into the vessel or into the vessel interior so that along the stack direction the inlet/outlet connector opens into the vessel between the two connecting lines. In this way, the advantage of an even refrigerant distribution achieved with the help of the connecting line is further amplified.

According to another advantageous further development, a closure can be arranged in the vessel interior, by means of which the fluidic connection of the connector interior with the vessel interior is interrupted. Thus, there is a fluidic connection in this further development between the connector interior and the vessel interior exclusively via the connecting line.

Particularly preferably, two inlet/outlet connectors can be present and, with respect to the stack direction, be arranged spaced apart from one another. In this way, heat exchangers having a large number of tubular bodies can also be evenly supplied with refrigerant.

Particularly practically, an interior cross-section of the connector interior is larger than an interior cross-section of a tubular interior delimited by the connecting line.

According to a further advantageous development, the tubular bodies are formed as flat tubes which in a cross-section perpendicularly to the longitudinal direction comprise two narrow sides located opposite one another and two wide sides located opposite one another each. The tubular bodies can each be formed as folded or extruded tubes. The tubular bodies, in particular the flat tubes, can be formed as multi-chamber tube having at least two chambers fluidically separated from one another, wherein the fluidic separation can be realised by means of a respective partition wall preferably formed integrally on the tubular body.

Furthermore, the invention relates to a refrigerant circuit in which a heat exchanger according to the invention introduced above is arranged, and in which during the operation a refrigerant circulates. Thus, the advantages of the heat exchanger according to the invention apply also to the motor vehicle according to the invention.

In the case that the heat exchanger is formed so as to be switchable between two or more operating modes, the heat exchanger can function as evaporator in a first operating state and as condenser in a second operating state.

The invention also relates to a motor vehicle having a refrigerant circuit introduced above. In a preferred use, the heat exchanger can be operated as condenser in the refrigerant circuit of the motor vehicle according to the invention. In the condenser, the hot vaporous pressurised refrigerant is liquefied and the refrigerant emits heat in the process.

In a further preferred use, the heat exchanger can be operated as evaporator in the refrigerant circuit of the motor vehicle according to the invention. In the evaporator, the cold liquid refrigerant changes into a gaseous state and the refrigerant absorbs heat in the process.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

Figure 2:
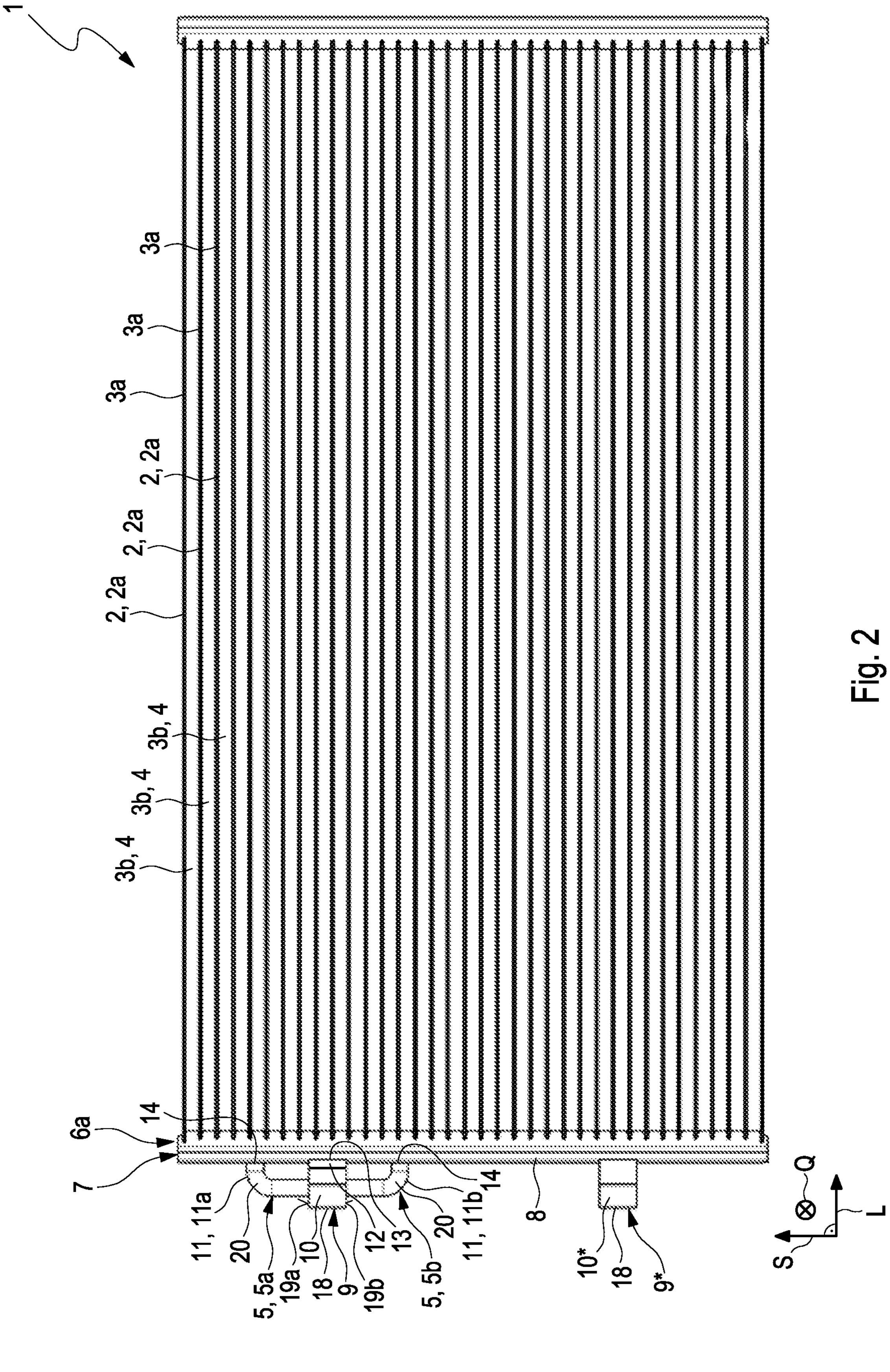
Figure 3:
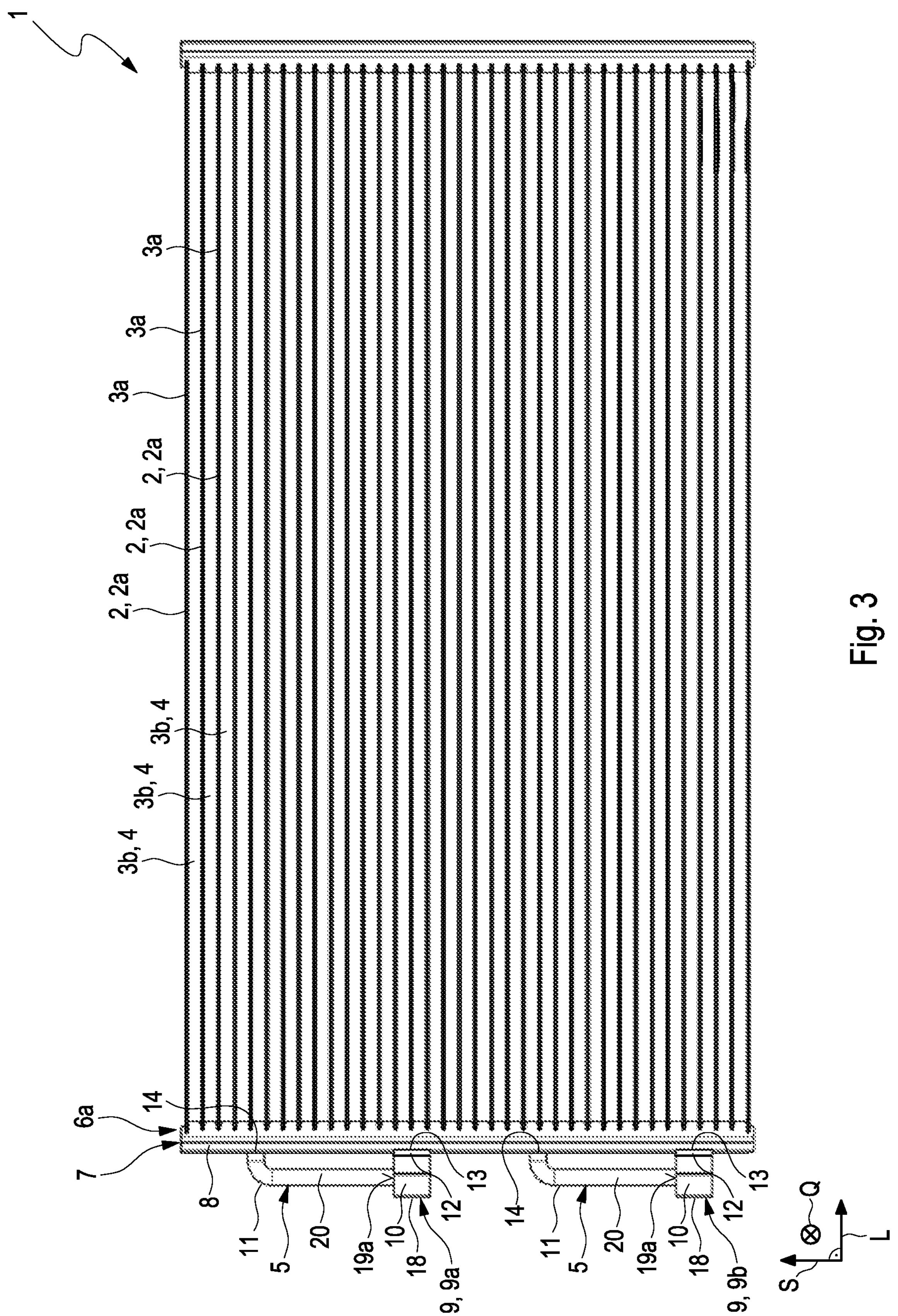
Figure 4:
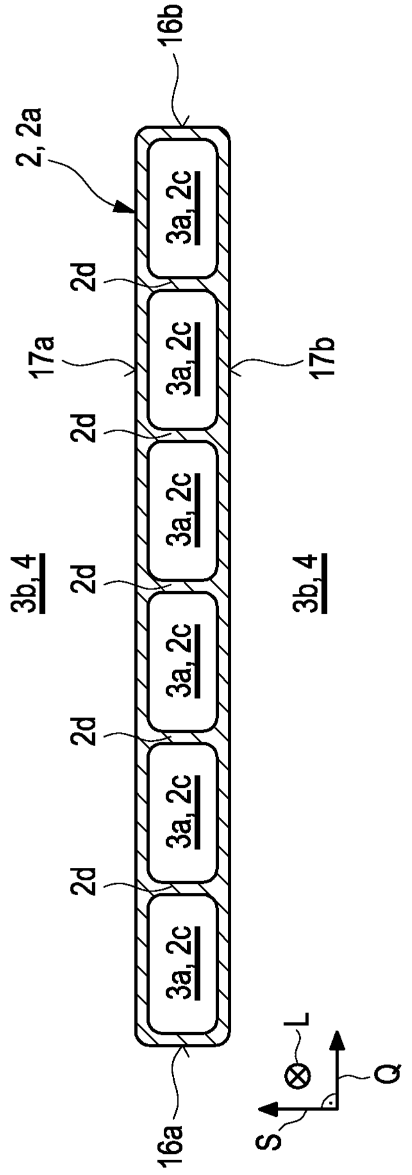

It shows, in each case schematically:

FIG. 1 an example of a heat exchanger according to the invention,

FIG. 2 a first variant of the example of FIG. 1,

FIG. 3 a second variant of the example of FIG. 1,

FIG. 4 in a highly simplified representation, a cross-section through one of the tubular bodies of the heat exchanger.

FIG. 1 illustrates an example of a heat exchanger 1 according to the invention in a lateral view shown in a schematic highly simplified manner. The heat exchanger 1 includes a plurality of tubular bodies 2 stacked onto one another along a stack direction S. The tubular bodies 2 delimit in each case a first fluid path 3*a* for being flowed through by a refrigerant. The individual tubular bodies 2 are arranged spaced apart from one another along the stack direction S. Intermediate spaces 4 formed between the tubular bodies 2 adjacent in the stack direction S each form a second fluid path 3*b* that is fluidically separated from the first fluid paths 3*a* for being flowed through by air. In the example, the individual tubular bodies 2 extend perpendicular to the stack direction S along a longitudinal direction L. Thus, the refrigerant can flow along the longitudinal direction L through the individual tubular bodies 2. The air can flow along a transverse direction Q, which extends perpendicularly both to the stack direction S and also to the longitudinal direction L, through the intermediate spaces 4 or the second fluid paths 3*b*. In the intermediate spaces 4, a rib structure (not shown) with ribs can be arranged in each case, on which the tubular bodies 2 delimiting the respective intermediate space 4 in the stack direction S support themselves.

Practically, the tubular bodies 2 can each be formed as flat tubes 2*a*, which in a cross-section perpendicularly to the longitudinal direction L shown in FIG. 4 have in each case two narrow sides 16*a*, 16*b* and two wide sides 17*a*, 17*b* located opposite one another in each case. The tubular body 2 shown in FIG. 4 is formed as multi-chamber tube 2*b* which purely exemplarily has six chambers 2*c* each fluidically separated from one another. The fluidic separation between the individual chambers 2*c* is realised by means of a respective partition wall 2$d$ integrally formed on the tubular body 2. In the example of FIG. 4, five partition walls 2$d$ are thus present. In variants of this example, a different number of chambers 2$c$ and corresponding partition walls 2$d$ can also be provided.

According to FIG. 1, a vessel 7 which extends in the stack direction S and fluidically communicates with the tubular bodies 2 is arranged on a, with respect to the longitudinal direction L, first longitudinal end 6$a$ of the tubular bodies 2, which vessel 7 is arranged depending on the fluidic interconnection of the heat exchanger 1 in a refrigerant circuit of a motor vehicle (not shown) for distributing the refrigerant over the first fluid paths 3$a$ or for collecting refrigerant having flowed through the first fluid paths 3$a$.

From the vessel 7, two inlet/outlet connectors 9, 9* each partially delimiting a connector interior 10 project to the outside for introducing the refrigerant into a vessel interior 8 surrounded by the vessel 7 or for discharging the refrigerant out of the vessel interior 8. The two inlet/outlet connectors 9, 9* are arranged spaced apart from one another with respect to the stack direction S. The respective connector interior 10 opens into the vessel interior 8 so that via a connector opening 18, which is formed on the front side and facing away from the vessel 7 on the respective inlet/outlet connector 9, 9*, refrigerant can be introduced into the respective connector interior 10, 10* and via the same conducted on into the vessel interior 8.

In the example of FIG. 1, a connecting line 5 that can be flowed through by the refrigerant leads away from the inlet/outlet connector 9—but not from the inlet/outlet connector 9*—by means of which the connector interior 10 fluidically communicates with the vessel interior 8. The connecting line 5 in the example is formed as a connecting tubular body 11 surrounding a tubular body interior 20. In the exemplary scenario, the connecting line 5 or the connecting tubular body 11 is thus arranged outside the connector interior 10 and extends from the inlet/outlet connector 9 to the vessel 7. As shown, the connecting line 5 or the connecting tubular body 11 can project from the inlet/outlet connector 9.

Alternatively to this it is also conceivable, however, that the connecting line 5 or the connecting tubular body 11 is arranged in the connector interior 10 (not shown in the figures).

By means of the connecting line 5, a fluidic parallel connection is thus realised, so that the refrigerant introduced into the connector interior 10 via the connector opening 18 can be introduced into the vessel interior 8 either directly via the connector interior 10 or indirectly via a successive flow through connector interior 10 and connecting line 5. An opening 13 of the inlet/outlet connector 9 into the vessel 7 or into the vessel interior and an opening 14 of the connecting line 5 into the vessel 7 or into the vessel interior 8 are arranged with respect to the stack direction S spaced apart from one another. With regard to the stack direction S, at least ¼ of all tubular bodies 2 present can be arranged between the opening 13 of the inlet/outlet connector 9 and an opening 14 of the connecting line 5 into the vessel 7 or into the vessel interior 8. Likewise, at least three, preferentially five tubular bodies 2 can be arranged along the stack direction S between the opening 13 of the inlet/outlet connector 9 into the vessel 7 or into the vessel interior 8 and the opening 14 of the connecting line 5 into the vessel 7 or into the vessel interior 8.

FIG. 2 shows exemplarily a further development of the example of FIG. 1. The example of FIG. 2 differs from that of FIG. 1 in that two connecting lines 5, 5$a$, 5$b$ or connecting tubular bodies 11, 11$a$, 11 $b$ can be provided on the inlet/outlet connector 9 here. These two connecting lines 5$a$, 5$b$ project, on sides 19$a$, 19$b$ located opposite one another in the stack direction S, from the inlet/outlet connector 9. The two connecting lines 5$a$, 5$b$ both open, spaced apart from one another and also spaced apart from the inlet/outlet connector 9 in respective openings 14 into the vessel 7 or into the vessel interior 8.

As is additionally illustrated by FIG. 2, the inlet/outlet connector 9 or the connector interior 10 opens, with respect to the stack direction S, between the two connecting lines 5$a$, 5$b$, into the vessel 8 or into the vessel interior 8.

FIG. 3 shows a further variant of the example of FIG. 1, in which both inlet/outlet connectors 9$a$, 9$b$ like the inlet/outlet connector 9 of FIG. 1, are thus equipped with a respective connecting line 5. In the example of FIG. 3, the two connecting lines 5$a$, 5$b$ project on the same side 19$a$ from the respective inlet/outlet connector 9$a$, 9$b$. However, it is also conceivable that the two connecting lines 5$a$, 5$b$ project from sides 19$a$, 19$b$ of the respective inlet/outlet connector 9 located opposite one another (not shown).

The example of FIG. 3 can be combined with that of FIG. 2.

In a variant, which can be realised in all examples explained above, a closure 12 can be arranged in the vessel interior 8 by means of which the fluidic connection of the connector interior 10 to the vessel interior 8 is interrupted. This means that a fluidic connection between the connector interior 10 and the vessel interior 8 in this variant exclusively exists via the connecting line 5, whereas the direct fluidic connection of the connector interior 10 to the vessel interior 8 explained in the examples above is no longer required.

Practically, an interior cross-section of the connector interior 10 can be larger in all explained examples, than an interior cross-section of the tubular interior 20 delimited by the connecting line 5, 5$a$, 5$b$ or by the connecting tubular body 11, 11$a$, 11$b$.

The specification can be best understood with reference to the following Numbered Paragraphs:

Numbered Paragraph 1. A heat exchanger (1), in particular for a motor vehicle, having a plurality of tubular bodies (2) stacked onto one another along a stack direction (S), which each delimit a first fluid path (3$a$) for being flowed through by a refrigerant (K) and which are arranged spaced apart from one another along the stack direction (S), so that between the intermediate spaces (4) formed between the tubular bodies (2) that are adjacent in the stack direction (S), each form a second fluid path (3$b$) that is separate from the first fluid paths (3$a$) for being flowed through by air, wherein the tubular bodies (2) extend transversely, preferentially perpendicularly to the stack direction (S) along a longitudinal direction (L), wherein on a, with respect to the longitudinal direction (L), first longitudinal end (6$a$) of the tubular bodies (2) a vessel (7) which extends in the stack direction (S) and fluidically communicates with the tubular bodies (2) for distributing the refrigerant over the first fluid paths (3$a$) or for collecting the refrigerant having flowed through the first fluid paths (3$a$), is arranged, wherein from the vessel (7) at least one inlet/outlet connector (9) at least partially delimiting a connector interior (10) for introducing the refrigerant into a vessel interior (8) surrounded by the vessel (7) or for discharging the refrigerant out of the vessel interior (8) projects to the outside, wherein the connector interior (10) opens into the vessel interior (8) and in this way fluidically communicates with the vessel interior (8), wherein the heat exchanger (1) includes at least one connecting line (5) that can be flowed through by the refrigerant, by means of which the connector interior (10), additionally to the direct fluidic connection of the connector interior (10) to the vessel interior (8), likewise fluidically communicates with the vessel interior (8)

Numbered Paragraph 2. The heat exchanger according to Numbered Paragraph 1, characterised in that at least one connecting line (5) is formed as a connecting tubular body (11) surrounding a first tubular body interior (20).

Numbered Paragraph 3. The heat exchanger according to either of Numbered Paragraphs 1 or 2, characterised in that at least one connecting line (5) or the connecting tubular body (11) is arranged in the connector interior (10); or/and in that at least one connecting line (5) or the connecting tubular body (11) is arranged outside the connector interior (10) and extends from the inlet/outlet connector (9) to the vessel (7) and preferentially projects from the inlet/outlet connector (9).

Numbered Paragraph 4. The heat exchanger according to either of Numbered Paragraph 2 or 3, characterised in that by means of at least one connecting line (5) a fluidic parallel connection is realised, so that the refrigerant (K) can be introduced into the vessel (7) or removed out of the vessel (7) either directly via the connector interior (10) or indirectly via a successive flow through the connector interior (10) and connecting line (5).

Numbered Paragraph 5. The heat exchanger according to any one of the Numbered Paragraphs 1 to 4, characterised in that an opening (13) of the inlet/outlet connector (9) and an opening (14) of at least one connecting line (5) into the vessel (7) or into the vessel interior (8) are arranged with respect to the stack direction (S), spaced apart from one another.

Numbered Paragraph 6. The heat exchanger according to any one of the preceding Numbered Paragraphs, characterised in that along the stack direction (S) between the opening (13) of the inlet/outlet connector (9) and the opening (14) of the connecting line (5) into the vessel (7), at least ¼ of all tubular bodies (2) are arranged; or/and in that along the stack direction between the opening (13) of the inlet/outlet connector and the opening of the connecting line (5) into the vessel (2), at least three, preferentially five tubular bodies (2) are arranged.

Numbered Paragraph 7. The heat exchanger according to any one of the preceding Numbered Paragraphs, characterised in that two connecting lines (5, 5*a*, 5*b*) are present, which, located opposite one another in the stack direction (S), project from the inlet/outlet connector (9) and both spaced apart from one another and spaced apart from the inlet/outlet connector (9), open into the vessel (7) so that along the stack direction (S) the inlet/outlet connector (9) opens into the vessel (7) between the two connecting lines (5, 5*a*, 5*b*).

Numbered Paragraph 8. The heat exchanger according to any one of the preceding Numbered Paragraphs, characterised in that in the vessel interior (8) a closure (12) is arranged, by means of which the fluidic connection of the connector interior (10) to the vessel interior (8) is interrupted, so that a fluidic connection 20 between the connector interior (10) and the vessel interior (8) exclusively exists via the connecting line (5).

Numbered Paragraph 9. The heat exchanger according to any one of the preceding Numbered Paragraphs, characterised in that two inlet/outlet connectors (9, 9*a*, 9*b*) with a respective connecting line (5) are present and are arranged with respect to the stack direction (S) spaced apart from one another.

Numbered Paragraph 10. The heat exchanger according to any one of the preceding Numbered Paragraphs, characterised in that an interior cross-section of the connector interior (10) is larger than an interior cross-section of the tubular body interior (20) delimited by the connecting tubular body (11, 11*a*, 11*b*).

Numbered Paragraph 11. The heat exchanger according to any one of the preceding Numbered Paragraphs, characterised in that the tubular bodies (2) are formed as flat tubes (2*a*), which in a cross-section perpendicularly to the longitudinal direction (L) each have two narrow sides (16*a*, 16*b*), located opposite one another and two wide sides (17*a*, 17*b*) each located opposite one another.

Numbered Paragraph 12. A refrigerant circuit for circulating a refrigerant, in particular for a motor vehicle, in which a heat exchanger (1) according to any one of the preceding Numbered Paragraphs is arranged.

Numbered Paragraph 13. A motor vehicle having a refrigerant circuit according to Numbered Paragraph 12.

The invention claimed is:

1. A heat exchanger for a motor vehicle, comprising:

a plurality of tubular bodies stacked onto one another along a stack direction, which each delimit a first fluid path for being flowed through by a refrigerant and which are arranged spaced apart from one another along the stack direction, so that between the intermediate spaces formed between the tubular bodies that are adjacent in the stack direction, each form a second fluid path that is separate from the first fluid paths for being flowed through by air, wherein the tubular bodies extend perpendicularly to the stack direction along a longitudinal direction, wherein, with respect to the longitudinal direction, a first longitudinal end of each of the plurality of tubular bodies connects to a vessel that extends in the stack direction and fluidically communicates with the tubular bodies for distributing the refrigerant over the first fluid paths or for collecting the refrigerant having flowed through the first fluid paths, at least one inlet/outlet connector is directly coupled to the vessel forming a first fluid path, the at least one inlet/outlet connector at least partially delimiting a connector interior for introducing the refrigerant into a vessel interior surrounded by the vessel or for discharging the refrigerant out of the vessel interior such that the refrigerant projects outside of the heat exchanger, wherein the connector interior is connected with the vessel interior to allow for fluid communication between the connector interior and the vessel interior, and the at least one inlet/outlet connector further comprising at least one connecting line that can be flowed through by the refrigerant before the refrigerant reaches the vessel interior, wherein the at least one connecting line fluidically communicates with the vessel interior, wherein the at least one connecting line branches from the first fluid path via a junction, and wherein the branch of the at least one connecting line is lateral to the longitudinal direction and establishes a second fluid path.

2. The heat exchanger according to claim 1, wherein the at least one connecting line is formed by a connecting tubular body that defines a connector lumen.

3. The heat exchanger of claim 2, wherein the at least one connecting line is arranged in the connector interior; and in that the at least one connecting line is arranged outside the connector interior and extends from the inlet/outlet connector to the vessel and projects from the inlet/outlet connector.

4. The heat exchanger according to claim 2, wherein by means of the at least one connecting line a fluidic parallel connection is realised, so that the refrigerant can be introduced into the vessel or removed out of the vessel either directly via the connector interior or indirectly via a successive flow through the connector interior and the at least one connecting line.

5. The heat exchanger according to claim 1, wherein an opening of the inlet/outlet connector and an opening of the at least one connecting line into the vessel or into the vessel interior are arranged with respect to the stack direction, spaced apart from one another.

6. The heat exchanger of claim 1, wherein along the stack direction between the opening of the inlet/outlet connector and the opening of the at least one connecting line into the vessel at least ¼ of all tubular bodies are arranged; and in that along the stack direction between the opening of the inlet/outlet connector and the opening of the connecting line into the vessel, at least three, preferentially five tubular bodies are arranged.

7. The heat exchanger according of claim 1, wherein at least two connecting lines are present, which, located opposite one another in the stack direction, project from the inlet/outlet connector and both spaced apart from one another and spaced apart from the inlet/outlet connector, open into the vessel so that along the stack direction the inlet/outlet connector opens into the vessel between the at least two connecting lines.

8. The heat exchanger according to claim 1, wherein in the vessel interior a closure is arranged, by means of which the fluidic connection of the connector interior to the vessel interior is interrupted, so that a fluidic connection between the connector interior and the vessel interior exclusively exists via the at least one connecting line.

9. The heat exchanger according to claim 1, wherein two inlet/outlet connectors with a respective connecting line are present and are arranged with respect to the stack direction spaced apart from one another.

10. The heat exchanger according to claim 1, wherein an interior cross-section of the connector interior is larger than an interior cross-section of the connector lumen.

11. The heat exchanger according to claim 1, wherein the tubular bodies are formed as flat tubes, which in a cross-section perpendicularly to the longitudinal direction each have two narrow sides, located opposite one another and two wide sides each located opposite one another.

12. A refrigerant circuit for a motor vehicle, comprising:

at least one heat exchanger, wherein the at least one heat exchanger comprises:

a plurality of tubular bodies stacked onto one another along a stack direction, which each delimit a first fluid path for being flowed through by a refrigerant and which are arranged spaced apart from one another along the stack direction, so that between the intermediate spaces formed between the tubular bodies that are adjacent in the stack direction, each form a second fluid path that is separate from the first fluid paths for being flowed through by air, wherein the tubular bodies extend perpendicularly to the stack direction along a longitudinal direction, wherein, with respect to the longitudinal direction, a first longitudinal end of each of the plurality of tubular bodies connects to a vessel that extends in the stack direction and fluidically communicates with the tubular bodies for distributing the refrigerant over the first fluid paths or for collecting the refrigerant having flowed through the first fluid paths, at least one inlet/outlet connector, having a constant inner diameter, is directly coupled to the vessel forming a first fluid path, the at least one inlet/outlet connector at least partially delimiting a connector interior for introducing the refrigerant into a vessel interior surrounded by the vessel or for discharging the refrigerant out of the vessel interior such that the refrigerant projects outside of the heat exchanger, wherein the connector interior is connected with the vessel interior to allow for fluid communication between the connector interior and the vessel interior, and the at least one inlet/out connector further comprising at least one connecting line that can be flowed through by the refrigerant before the refrigerant reaches the vessel interior, wherein the at least one connecting line fluidically communicates with the vessel interior, wherein the at least one connecting line branches from the first fluid path via a junction, and wherein the branch of the at least one connecting line is lateral to the longitudinal direction and establishes a second fluid path.

13. The heat exchanger according to claim 12, wherein the at least one connecting line is formed by a connecting tubular body that defines a connector lumen.

14. The heat exchanger of claim 13, wherein the at least one connecting line is arranged in the connector interior; and in that the at least one connecting line is arranged outside the connector interior and extends from the inlet/outlet connector to the vessel and projects from the inlet/outlet connector.

15. The heat exchanger according to claim 13, wherein by means of the at least one connecting line a fluidic parallel connection is realised, so that the refrigerant can be introduced into the vessel or removed out of the vessel either directly via the connector interior or indirectly via a successive flow through the connector interior and the at least one connecting line.

16. A refrigerant circuit for a motor vehicle, comprising:

at least one heat exchanger, wherein the at least one heat exchanger comprises:

a plurality of tubular bodies stacked onto one another along a stack direction, which each delimit a first fluid path for being flowed through by a refrigerant and which are arranged spaced apart from one another along the stack direction, so that between the intermediate spaces formed between the tubular bodies that are adjacent in the stack direction, each form a second fluid path that is separate from the first fluid paths for being flowed through by air, wherein the tubular bodies extend perpendicularly to the stack direction along a longitudinal direction, at least one inlet/outlet connector is directly coupled to the vessel forming a first fluid path, and wherein the at least one inlet/out connector further comprising at least one connecting line that can be flowed through by the refrigerant before the refrigerant reaches the vessel interior, wherein the at least one connecting line fluidically communicates with the vessel interior, wherein the at least one connecting line branches from the first fluid path via a junction, and wherein the branch of the at least one connecting line is lateral to the longitudinal direction and establishes a second fluid path.

17. The heat exchanger according to claim 16, wherein the at least one connecting line is formed by a connecting tubular body that defines a connector lumen.

18. The heat exchanger of claim 17, wherein the at least one connecting line is arranged in a connector interior; and in that the at least one connecting line is arranged outside the connector interior and extends from the inlet/outlet connector to the vessel and projects from the inlet/outlet connector.

19. The heat exchanger according to claim 17, wherein by means of the at least one connecting line a fluidic parallel connection is realised, so that the refrigerant can be introduced into the vessel or removed out of the vessel either directly via a connector interior or indirectly via a successive flow through the connector interior and the at least one connecting line.

* * * * *